United States Patent [19]

Fatehi et al.

[11] Patent Number: 5,801,863
[45] Date of Patent: Sep. 1, 1998

[54] MAINTENANCE OF OPTICAL NETWORKS

[75] Inventors: Mohammad T. Fatehi, Middletown; Fred Ludwig Heismann, Tinton Falls, both of N.J.

[73] Assignee: Lucent Technologies Inc., Murray Hill, N.J.

[21] Appl. No.: 808,231

[22] Filed: Feb. 28, 1997

Related U.S. Application Data

[62] Division of Ser. No. 579,529, Dec. 27, 1995.

[51] Int. Cl.$^6$ .............................. H04J 14/02; H04B 10/16
[52] U.S. Cl. ........................ 359/124; 359/110; 359/133; 359/161; 359/177
[58] Field of Search ............................ 359/110, 124, 359/125, 132, 133, 134, 161, 175, 177

[56] References Cited

U.S. PATENT DOCUMENTS

| | | | |
|---|---|---|---|
| 5,276,543 | 1/1994 | Olshansky | 359/161 |
| 5,296,956 | 3/1994 | Fatehi et al. | 359/110 |
| 5,317,439 | 5/1994 | Fatehi | 359/110 |
| 5,436,750 | 7/1995 | Kawano | 359/110 |
| 5,654,816 | 8/1997 | Fishman | 359/177 |

OTHER PUBLICATIONS

Appl. Phys. Lett. 56(3), 15 Jan. 1990, 1990 American Institute of Physics, "Polarization–independent acoustically tunable optical filter" by D. A. Smith et al., pp. 209–211.
Appl. Phys. Lett. 53(1), 4 Jul. 1988, 1988 American Institute of Physics "Poloarization–independent electro–optically tunable narrow–band wavelength filter" by W. Warzanskyj et al., pp. 13–15.

*Primary Examiner*—Leslie Pascal
*Attorney, Agent, or Firm*—Thomas Stafford; Gregory J. Murgia

[57] ABSTRACT

An apparatus is provided for adding a dither signal to an optical carrier modulated with an information signal. The apparatus includes a dithering element having an input and an output in series with an optical carrier modulated with an information signal. A differential element having an inverting input, a non-inverting input, and an output is coupled to the input of the dithering element. A signal generator, which is provided for producing a desired dither signal to be added to the modulated optical carrier, is coupled to the non-inverting input of the differential element. A feedback element produces a signal related to the output of the dithering element and couples the signal related to the output of the dithering element to the inverting input of the differential element.

9 Claims, 3 Drawing Sheets

MAINTENANCE OF OPTICAL NETWORKS

This application is a Division of U.S. patent application Ser. No. 08/579529 filed on Dec. 27, 1995. (Notice of Allowance dated Nov. 4, 1997)

TECHNICAL FIELD

This disclosure relates to optical communications. More particularly, this disclosure relates to maintenance signals and the like used in optical communications. In one example of the invention, an optical network operator modulates one or more optical carrier waves already modulated by customers or users of the networks.

BACKGROUND

Users of an optical communications system send signals to one another by modulating an optical carrier wave in a prescribed manner. In addition to the normal communications signals sent and received by users of an optical communication system, it may be advantageous for there to be other signals sent from one location within the optical communications system to another location in the system without interfering with the signals of the users. For example, it may be advantageous for the operator of the optical communications system to further modulate an optical carrier wave at a prescribed point within the communication system and monitor that modulated carrier wave at another prescribed point after it has passed through one or more components of the communications system to identify and isolate faults in the communications system. See, for example, U.S. Pat. Nos. 5,296,956 and 5,317,439.

To ensure proper and reliable operation of modern all-optical networks, the performance of its various nodes and links has to be continuously monitored, similarly to today's electrical networks, to detect and locate failures immediately after they occur to allow for quick repairs. Ideally such monitoring should be performed continuously during normal operation of the optical network without interrupting or interfering with the optical information signals carried over the network.

Moreover, modern optical networks simultaneously carry multiple optical signals at different wavelengths over each link. These wavelength-division-multiplexed optical information carriers will be separated and re-arranged at certain nodes in the network and may even be translated to different carrier wavelengths, if necessary, in order to be routed to their different designated destinations (locations). Such complicated networks require sophisticated schemes to track the proper routing of the various individual information carriers through the network and at the same time to monitor the performance of the nodes and links.

A method for monitoring the performance of an optical network that carries only one optical information signal over each line connecting the various nodes of the network is described in the U.S. patents previously referenced. In this scheme, a unique, unambiguous optical maintenance signal either at the same wavelength as the optical carrier or at a different wavelength is injected at various points in the network and detected at one or more central locations in the network, allowing unambiguous detection and location of faults in the network.

Wavelength-multiplexed optical networks, however, may not allow injection of additional optical maintenance signals at wavelengths other than the predetermined optical carrier frequencies. More importantly, such additional maintenance signals do not permit monitoring of the proper routing of the various carriers since they cannot be selectively routed along the different paths of the re-arranged optical carriers. Common simultaneous modulation of the amplitudes of all multiplexed carriers entering or exiting a node provides for unique performance monitoring but will have to be repeated many times at each node and the modulation index will thus grow rapidly, eventually severely impairing the signal transmission. Moreover, such common modulation of the multiplexed optical carrier also does not permit end-to-end monitoring and tracking of their routing through the network.

SUMMARY

This invention provides a practical method for monitoring and tracking end-to-end signal routing in multi-wavelength optical networks and for continuous on-line performance monitoring of the various nodes and links in the network. The method includes the step of individually tagging the various optical information carriers with unique identifier signals (i.e., frequency tones) before they enter the network and/or at the first node within the network. This is accomplished by individually modulating one of the characteristics of each carrier such as its amplitude, phase, frequency, state of polarization of each carrier, etc., with a unique frequency tone that unambiguously identifies the optical wavelength of the carrier. The frequency of this low-index carrier modulation preferably lies outside the information bandwidth of the optical information signal and can thus be removed when the optical carrier exits the network. The tones may also be replaced or refreshed at designated points in the network.

With a properly chosen unique set of tone frequencies, such as an orthogonal set of tones, this scheme allows unambiguous identification of the optical wavelengths of the various carriers passing through a node by simply monitoring the low-frequency modulation signals with a simple monitoring detection method. Furthermore, for fixed, predetermined modulation amplitudes of the tones the scheme simultaneously provides information on the relative intensities of the transmitted optical information carriers and on the optical signal-to-noise ratio. This property is advantageously useful in multiwavelength optical networks with in-line optical amplifiers, where the gain of the amplifier must be adjusted to the number of carriers (wavelengths) that pass through it. This helps reduce the complexity and cost of the monitoring points. Furthermore, secondary modulation of the identifier tones allows for unambiguous end-to-end signal identification of all the optical carriers passing through the network. The secondary modulation may be a digital or analog modulation of the amplitude, frequency or phase of the identifier tones. In the preferred embodiment of the invention, the frequency of the identifier tone is modulated digitally (frequency shift keying). The secondary modulation may carry additional overhead information such as the originating location and final destination of the signal, as well as specific information on the optical route through the network (i.e., paths, lines, nodes, alternate routes). The identifier tones and the overhead information may be monitored at any point in the network, i.e. before, after and possibly even within each network node to track the proper routing of the optical information carriers. The different frequencies of the identifier tones allow simultaneous detection and separation of the different overhead information of the wavelength-multiplexed signals with a single monitor detector circuit. At any point in the network, the identifier tone and/or the overhead information carried by it may be replaced by different overhead information at the same tone or at a different frequency. Such a change in tone frequency is advantageous when the optical wavelength of the information carrier is changed by a wavelength converter or an optical frequency shifter.

In accordance with one embodiment of the invention, an apparatus is provided for adding a dither signal to an optical carrier modulated with an information signal. The apparatus includes a dithering element having an input and an output in series with an optical carrier modulated with an information signal. A differential element having an inverting input, a non-inverting input, and an output is coupled to the input of the dithering element. A signal generator, which is provided for producing a desired dither signal to be added to the modulated optical carrier, is coupled to the non-inverting input of the differential element. A feedback element produces a signal related to the output of the dithering element and couples the signal related to the output of the dithering element to the inverting input of the differential element.

DETAILED DESCRIPTION

Figure 1:
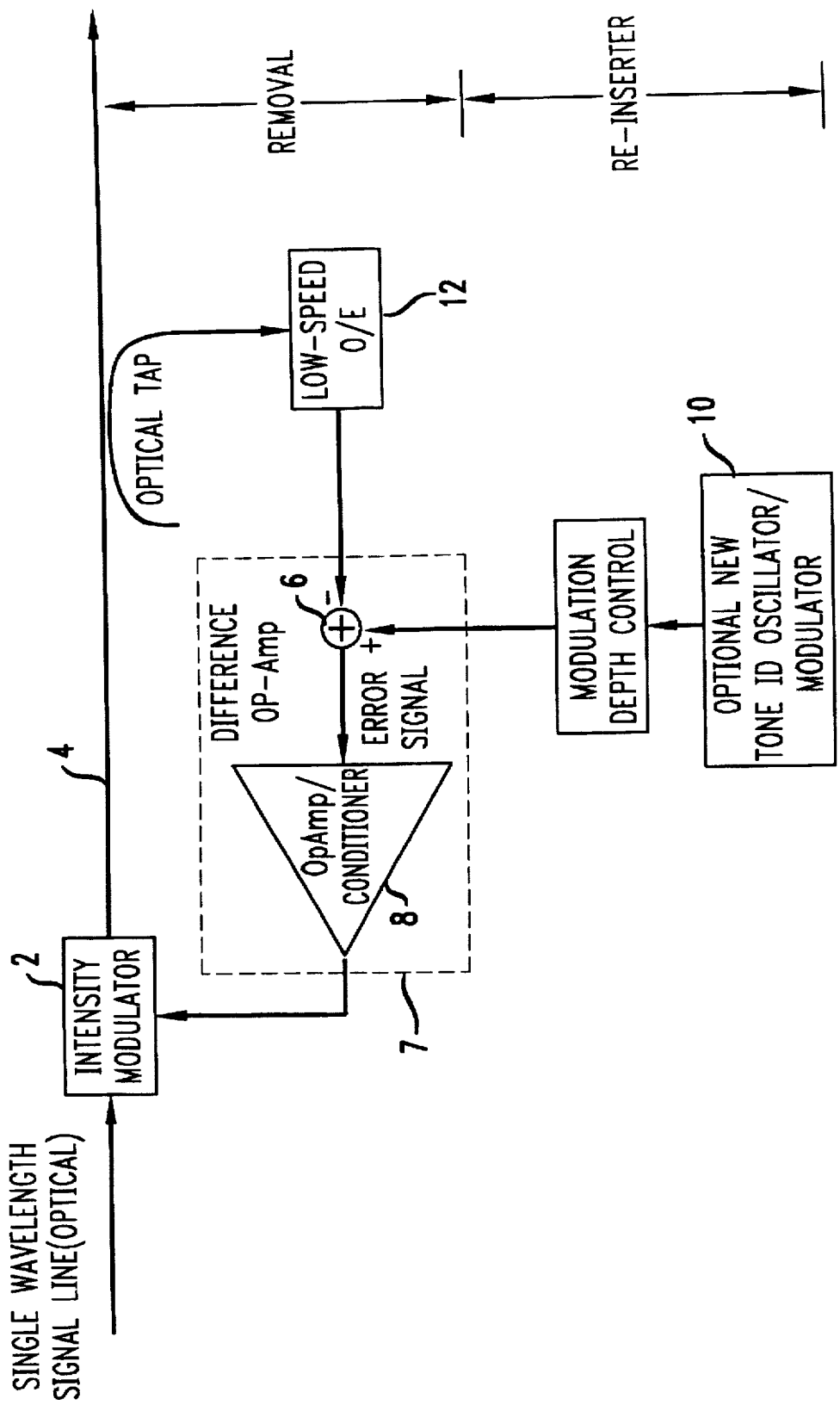
FIG. 1 shows a schematic diagram of an apparatus for adding, removing or changing an identifier tone to an optical carrier modulated with an information signal, which is constructed according to the principles of the invention.

FIG. 1 shows one embodiment of the present invention in which an identifier tone is added to an optical carrier modulated with an information signal. A dithering element 2 such as an intensity modulator is placed in series with an optical carrier 4 which is modulated with an information signal. Suitable optical intensity modulators that impress modulation onto a single-wavelength signal include, but are not limited to, electro-absorption modulators, electro-optic modulators, magneto-optical modulators, Fabry-Perot devices, and mechanical fiber modulators. In one particular embodiment of the invention, the optical intensity of the optical information carrier is amplitude modulated by a tone having a frequency between ~10 Hz and 100 khz, or higher, which is further modulated by digital overhead information. The modulation index of the amplitude modulation is preferably small (typically less than 10%) to avoid excessive degradation of the primary information signal.

A differential amplifier element 7 has an inverting input, a non-inverting input, and an output that is coupled to an input of the dithering element 2. As seen in FIG. 1, the differential amplifier element may be formed by an adder 6 and an operational amplifier conditioner 8 for providing the appropriate gain. A signal generator 10 produces the desired identifier tone and overhead information to be added to the modulated optical carrier. The tone generator 10 is coupled to the non-inverting input of the differential element 7. A feedback element or monitor 12 such as an optical tap and a low-speed photodiode can be used to monitor the modulation index of the identifier tone modulated on to the optical carrier by producing a signal related to the output of the dithering element 2. The feedback element 12 couples this signal to the inverting input of the differential element 7 so that the dither signal is added to the optical carrier.

In another embodiment of the invention, a digital signal processor is used to perform the functions of the differential amplifier element 7 and the signal generator 10.

The embodiment of the invention shown in FIG. 1 also may be used to remove the tone modulation from the optical carrier. In this case negative feedback from the feedback element 12 is used to drive the intensity modulator 2 in anti-phase with the tone-modulation imparted by the signal generator 10 such that the intensity modulation is substantially removed. This of course reduces the average optical power of the carrier somewhat, which, however, may be compensated for by an optical amplifier.

Figure 2:
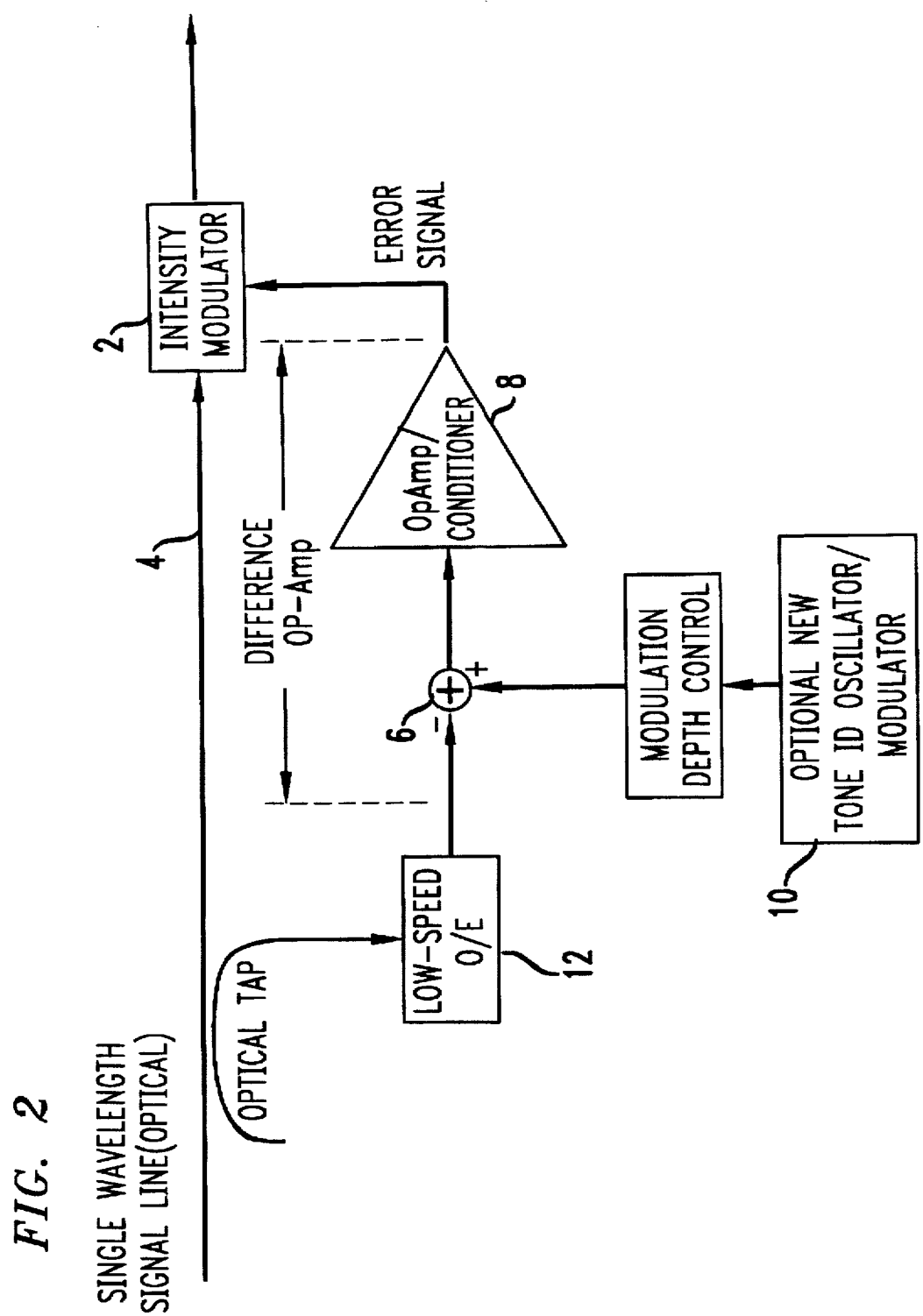
FIG. 2 shows an alternative embodiment of the invention of FIG. 1.

FIG. 2 shows an alternative embodiment of the invention in which the identifier tone is removed from the optical carrier by reversing the sequence of the monitor 12 and the signal generator 10 so that the monitor 12 now provides a feedforward signal.

In general, the embodiments of the invention described above only allow for tone modulation or tone removal of an individual optical carrier if no more than one carrier enters the modulator 2. In the presence of multiple carriers, all carriers are simultaneously modulated with the same tone and the same overhead information. However, even with multiple wavelength-multiplexed carriers passing simultaneous through an optical port, it is possible to add or remove a maintenance tone to or from any of the individual carriers by using for modulator 2 a wavelength selective optical intensity modulator such as, but not limited to, the acousto-optical device described, for example, in D. A. Smith et al., "Polarization-Independent Acoustically Tunable Optical Filter," Appl. Phys. Lett., vol. 56, pp. 209–211, 1990. This acousto-optic device is usually used as a tunable wavelength filter or as a wavelength-selective channel add/drop element, but it can be easily operated as an optical intensity modulator that controllably directs a small variable amount of light at the selected wavelength from the straight-through output to the (here unused) add-drop port. Such a device can in fact be used to modulate all transmitted wavelength channels at the same time with different tones and different overhead information, where each of the modulated tones is encoded on a unique electrical carrier at a frequency $F_i$ modulating the optical carrier at a wavelength $\lambda_i = \Delta n v_a / F_i$, where $\Delta n = n_{TE} - n_{TM}$ denotes the birefringence in the crystal and $v_a$ is the velocity of sound. A similar wavelength-selective modulator may also be designed in accordance with an electro-optic tunable optical filter such as described in Warzanski et al., "Polarization-Independent Electro-Optically Tunable Narrow-Band Wavelength Filter," Appl. Phys. Lett., vol. 53, pp. 13–16, 1988.

Figure 3:
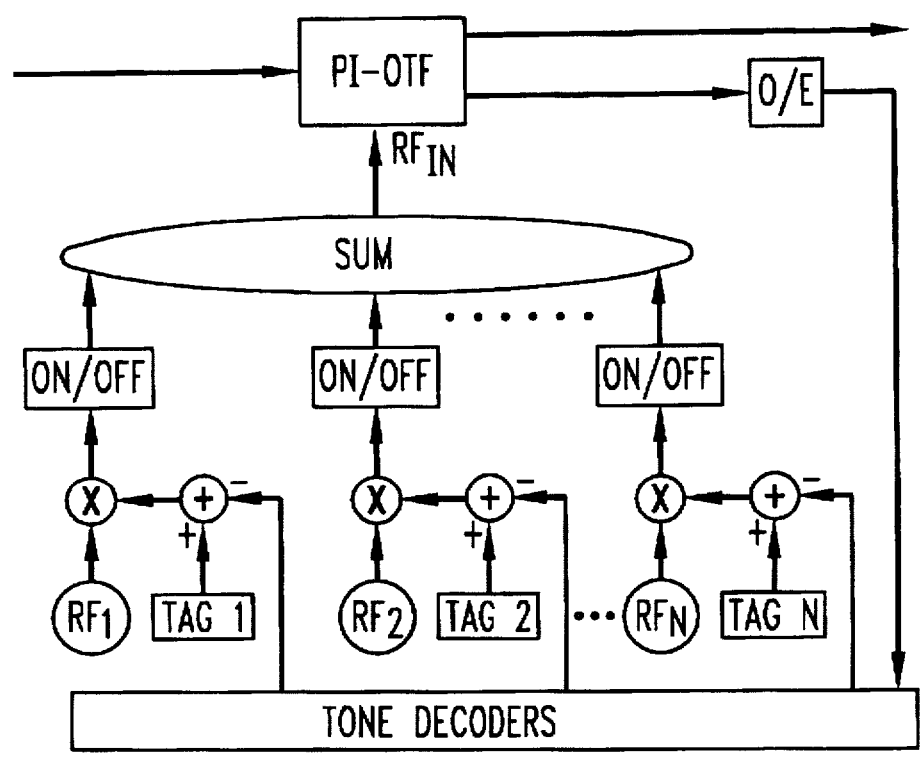
FIG. 3 shows an embodiment of the invention in which multiple identifier tones may be added, removed or changed for each wavelength in a multi-wavelength optical line.

By using a wavelength selective modulator such as described above, each of these identifier tones, along with any of their possible overhead modulations, may be removed, refreshed, or changed at desired nodes and links in the network (even at locations where different wavelength channels are not demultiplexed). This assists in tracking each of the channels and also permits tone reuse within the multi-wavelength optical network. An embodiment of the invention which permits adding, removing, or changing multiple tag tones for each of the wavelengths in the multi-wavelength optical line or link is shown in FIG. 3. This embodiment employs an acousto-optic wavelength modulator such as described above. Moreover, the present invention may employ any other type of wavelength selective modulator.

Additional information may be carried by secondary modulation of the tone. Each of the tones which tags each wavelength carrier can be further modulated by an analog or digital signal. A preferred method for modulation of this secondary information is by a constant envelope digital modulation scheme such as the continuous phase binary frequency shift keying (CP-BFSK). The constant amplitude modulation permits the preservation of the tone amplitude representing the signal strength and, at the same time, the nonlinearities of optical devices do not distort this secondary information. This secondary modulated signal, which can be easily read, written, or modified at any node, can carry routing information about the path through the network and the specific nodes that the optical wavelength passes through and is useful for diagnostic purposes.

The identifier tones can be easily monitored at any point in the network if the tones for the various carriers are chosen at substantially different frequencies (e.g. a tone frequency for each wavelength, preferably an orthogonal set of tones). The various tones of any number of wavelength multiplexed carriers may then be simultaneously detected by an optical tap and a low-speed photodetector and subsequently separated by an electrical network using proper frequency filters tuned to the frequencies of the various tones.

We claim:

1. A method of monitoring performance and signal routing in a multi-wavelength all-optical network, comprising the steps of modulating a unique low-frequency identifier tone to each individual optical carrier before entering the network;

detecting the identifier tones of the multiplexed optical carrier simultaneously at various locations in the network;

regenerating the identifier tones within the network; and removing the identifier tones at exit nodes of the network.

2. The method of claim 1 wherein the identifier tones are modulated with secondary overhead information identifying the origin, destination and path of each carrier.

3. The method of claim 2 wherein the secondary overhead information is modulated digitally.

4. The method of claim 2 wherein the step of detecting includes the step of selectively detecting the secondary overhead information.

5. The method of claim 1 wherein the identifier tone has a modulation index set at a prescribed value.

6. A method of monitoring performance and signal routing in a multi-wavelength all-optical network, comprising the steps of:

modulating a unique low-frequency identifier tone to each individual optical carrier before entering the network;

modulating the identifier tone with secondary overhead information identifying origin, destination, and path of each carrier;

detecting the identifier tone of the multiplexed optical carrier simultaneously at various locations in the network;

regenerating the identifier tone within the network and replacing the secondary overhead information with different secondary overhead information; and removing the identifier tone at exit nodes of the network.

7. The method of claim 6, wherein the secondary overhead information is modulated digitally.

8. The method of claim 6, wherein the step of detecting includes the step of selectively detecting the secondary overhead information.

9. The method of claim 6, wherein the identifier tone has a modulation index set at a prescribed value.

* * * * *